(12) United States Patent
Zhu

(10) Patent No.: US 12,166,697 B2
(45) Date of Patent: *Dec. 10, 2024

(54) TRANSMITTING METHOD AND DEVICE AND RECEIVING METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,314

(22) Filed: Nov. 8, 2022

(65) Prior Publication Data

US 2023/0059900 A1    Feb. 23, 2023

Related U.S. Application Data

(63) Continuation of application No. 16/959,083, filed as application No. PCT/CN2017/120311 on Dec. 29, 2017, now Pat. No. 11,528,103.

(51) Int. Cl.
*H04L 5/00* (2006.01)
*H04W 48/16* (2009.01)
(Continued)

(52) U.S. Cl.
CPC .......... *H04L 5/0005* (2013.01); *H04L 5/0053* (2013.01); *H04W 48/16* (2013.01); *H04W 48/18* (2013.01); *H04W 72/0446* (2013.01)

(58) Field of Classification Search
CPC .... H04L 5/0005; H04L 5/0053; H04W 48/16; H04W 48/18; H04W 72/0446
(Continued)

(56) References Cited

U.S. PATENT DOCUMENTS

2013/0044831 A1* 2/2013 Narasimha .......... H04W 52/365
455/522
2013/0301486 A1* 11/2013 Kishiyama ................ H04L 5/14
370/277

(Continued)

FOREIGN PATENT DOCUMENTS

CN    101772082 A    7/2010
CN    101888593 A    11/2010
(Continued)

OTHER PUBLICATIONS

International Search Report issued to PCT Application No. PCT/CN2017/120311 dated Jul. 4, 2018, (4p).
(Continued)

*Primary Examiner* — Faisal Choudhury
(74) *Attorney, Agent, or Firm* — Arch & Lake LLP

(57) ABSTRACT

The present disclosure relates to the field of communications technologies, and in particular, to a transmitting method, applicable to a base station. The method includes: determining a first time/frequency resource for data to be transmitted, the data to be transmitted being indicated by a first signaling to be transmitted, and a second time/frequency resource for a second signaling to be transmitted; determining an overlapping time/frequency resource between the first time/frequency resource and the second time/frequency resource; and transmitting at least one of the second signaling or transmitting the data to be transmitted to first user equipment on the overlapping time/frequency resource.

6 Claims, 8 Drawing Sheets

(51) Int. Cl.
*H04W 48/18* (2009.01)
*H04W 72/0446* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0237626 | A1* | 8/2015 | Li | H04W 72/21 370/336 |
| 2017/0265214 | A1 | 9/2017 | Hessler et al. | |
| 2019/0289579 | A1* | 9/2019 | Li | H04W 72/23 |
| 2020/0028642 | A1* | 1/2020 | He | H04L 5/0048 |
| 2020/0213989 | A1* | 7/2020 | Choi | H04L 5/0007 |
| 2020/0296706 | A1* | 9/2020 | Du | H04W 72/0446 |
| 2021/0050944 | A1* | 2/2021 | Zhang | H04W 72/0446 |
| 2021/0227479 | A1* | 7/2021 | Harada | H04W 24/10 |

FOREIGN PATENT DOCUMENTS

| | | |
|---|---|---|
| CN | 105451211 A | 3/2016 |
| CN | 107027179 A | 8/2017 |
| CN | 107071903 A | 8/2017 |
| EP | 3200528 A1 | 8/2017 |
| WO | 2016074416 A1 | 5/2016 |
| WO | 2017127974 A1 | 8/2017 |
| WO | 201766896 A1 | 10/2017 |
| WO | 2017166386 A1 | 10/2017 |

OTHER PUBLICATIONS

Zte et al. "On Dynamic Resource Sharing", 3GPP TSG RAN1 90bis R1-1717044, Oct. 13, 2017,(5p).

Extended European Search Report issued to European Application No. 17936450.0 dated Nov. 20, 2020, (7p).

Huawei, et al., "SR Procedure in NR", 3GPP TSG-RAN2 Meeting #99bis—R2-1710109 Prague, Czech Republic, Oct. 9-13, 2017, (6p).

Chinese First Office Action issued in CN201780002369.8 dated on Oct. 29, 2021,(21p).

Intel Corporation, "Time-domain resource allocation for DL and UL data", 3GPP TSG RAN WG1 NR Ad-hoc#2, R1-1710566, Qingdao, P. R. China, Jun. 27-30, 2017,(6p).

Indian First Office Action issued in 202027028029 dated on Aug. 26, 2021,(6p).

* cited by examiner

TRANSMITTING METHOD AND DEVICE AND RECEIVING METHOD AND DEVICE

CROSS-REFERENCE TO RELATED APPLICATIONS

The present application is a continuation of U.S. patent application Ser. No. 16/959,083 filed on Dec. 29, 2017, which is the U.S. national phase of PCT Application No. PCT/CN2017/120311, filed on Dec. 29, 2017, the disclosures of which are incorporated hereby in their entireties for all purposes.

TECHNICAL FIELD

The present application relates to communication technologies field, and more particularly, to a transmitting method, a receiving method, a transmitting device, a receiving device, an electronic equipment and a computer-readable storage medium.

BACKGROUND

In LTE (Long Term Evolution), user equipment transmits data to and receives data from the base station, and needs to determine time/frequency resource according to signaling from the base station, and then receive data or transmit data on the determined time/frequency resource. Among them, based on the scenario of dynamic scheduling, the signaling is generally located at the initial position of the subframe, for example, at the first symbol of the subframe, and one signaling can only indicate time/frequency resource of data located in the same subframe as the signaling.

In NR (New Radio), in order to meet the needs of different services, a flexible scheduling mode is designed, so that the location of signaling is not limited to the initial position of the subframe, and signaling can indicate time/frequency resource of data located in different subframe from the signaling. However, based on this mode, the time/frequency resource corresponding to the data indicated by certain signaling may overlap with the time/frequency resource corresponding to the data indicated by another signaling, which may cause conflicts when base station transmits the data and the signaling on the overlapping time/frequency resource.

SUMMARY

In view of this, the embodiments of the present disclosure propose a transmitting method, a receiving method, a transmitting device, a receiving device, an electronic equipment and a computer-readable storage medium, to solve technical problems in the related art.

According to a first aspect of the present disclosure, there is provided a transmitting method, for applying to a base station, the transmitting method including:
  determining a first time/frequency resource for data to be transmitted, the data to be transmitted being indicated by a first signaling to be transmitted, and a second time/frequency resource for a second signaling to be transmitted;
  determining an overlapping time/frequency resource between the first time/frequency resource and the second time/frequency resource; and
  transmitting at least one of the second signaling or the data to be transmitted to first user equipment on the overlapping time/frequency resource.

According to a second aspect of the present disclosure, there is provided a receiving method, for applying to user equipment, the receiving method including:
  receiving a first signaling transmitted by a base station, wherein the first signaling is configured to indicate data to be transmitted, wherein a first time/frequency resource for the data to be transmitted and a second time/frequency resource for a second signaling transmitted by the base station have an overlapping time/frequency resource; and
  receiving at least one of the data to be transmitted or the second signaling on the overlapping time/frequency resource.

According to a third aspect of the present disclosure, there is provided electronic equipment, including: at least one processor; and a memory for storing instructions executable by the at least one processor. The at least one processor is configured to:
  receive a first signaling transmitted by a base station, wherein the first signaling is configured to indicate data to be transmitted, wherein a first time/frequency resource for the data to be transmitted and a second time/frequency resource for a second signaling transmitted by the base station have an overlapping time/frequency resource; and
  receive at least one of the data to be transmitted or the second signaling on the overlapping time/frequency resource.

BRIEF DESCRIPTION OF THE DRAWINGS

In order to more clearly illustrate technical solutions in the embodiments of the present application, the following will briefly introduce the drawings used in the description of the embodiments. Obviously, the drawings in the following description are only some of the embodiments of the present application. For those of ordinary skill in the art, without having creative labor, other drawings may be obtained based on these drawings.

DETAILED DESCRIPTION

The technical solutions in the embodiments of the present application will be described clearly and completely below in conjunction with the drawings in the embodiments of the present application. Obviously, the described embodiments are only a part of the embodiments of the present application, not all embodiments. Based on the embodiments in this application, all other embodiments obtained by a person of ordinary skill in the art without creative work fall within the scope of protection of this application.

Figure 1:
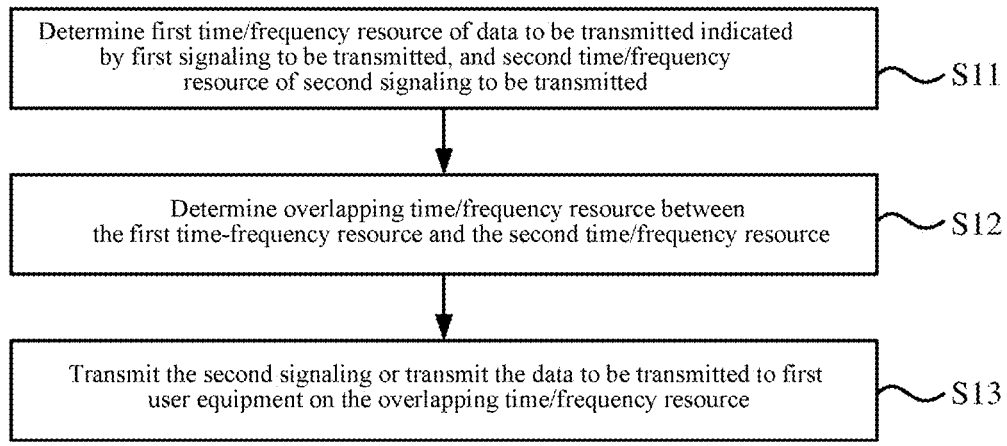
FIG. 1 shows a schematic flowchart of a transmitting method according to an embodiment of the present disclosure.

FIG. 1 shows a schematic flowchart of a transmitting method according to an embodiment of the present disclosure. The transmitting method shown in this embodiment can be applied to a base station, such as a 5G base station. As shown in FIG. 1, the method may include the following steps.

In step S11, first time/frequency resource of data to be transmitted indicated by first signaling to be transmitted and second time/frequency resource of second signaling to be transmitted are determined;

In step S12, overlapping time/frequency resource between the first time/frequency resource and the second time/frequency resource is determined; wherein the overlapping time/frequency resource includes resource overlapping in the time domain between the first time/frequency resource and the second time/frequency resource, such as an overlapping time domain transmission unit, further includes resource overlapping in the frequency domain between the first time/frequency resource and the second time/frequency resource, such as overlapping frequency band.

In step S13, the second signaling is transmitted or the data to be transmitted is transmitted to the first user equipment on the overlapping time/frequency resource.

Figure 2:
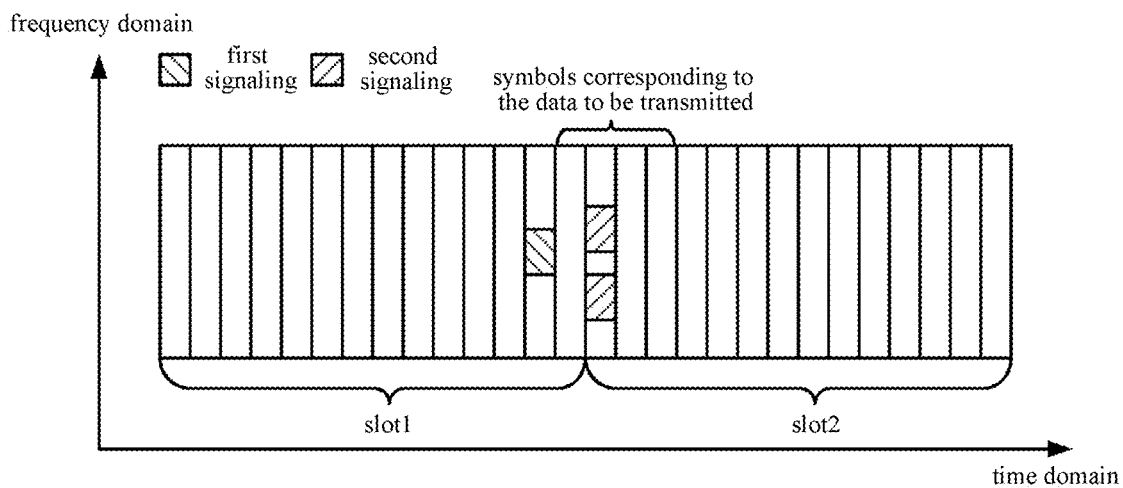
FIG. 2 shows a schematic diagram of a time/frequency resource according to an embodiment of the present disclosure.

FIG. 2 shows a schematic diagram of a time/frequency resource according to an embodiment of the present disclosure.

In one embodiment, as shown in FIG. 2 for example, first signaling corresponds to the $13^{th}$ symbol of slot1, second signaling corresponds to the first symbol of slot2, first time/frequency resource corresponds to the $14^{th}$ symbol of slot1 and the first three symbols of slot2. The second time/frequency resource corresponds to_the first symbol of slot2. That is, the first time/frequency resource and the second time/frequency resource exist overlapping on the first symbol of slot2.

In one embodiment, since the data to be transmitted is transmitted to first user equipment, and the first signaling is configured to indicate the first time/frequency resource of the data to be transmitted, the first signaling may also be transmitted to the first user equipment. The second signaling may be transmitted to the first user equipment, or may be transmitted to other user equipment.

In one embodiment, in a case where there has the overlapping time/frequency resource between the first time/frequency resource and the second time/frequency resource, only the second signaling may be transmitted on the overlapping time/frequency resource, or only the data to be transmitted may be transmitted to the first user equipment on the overlapping time/frequency resource, thereby avoiding conflicts between the transmission of the second signaling and the transmission of the data to be transmitted on the overlapping time/frequency resource, and ensuring that the base station can do the transmission operations smoothly on the overlapping time/frequency resource.

Optionally, the method further includes the following step.

If another signaling will be transmitted on time/frequency resource corresponding to the first signaling, then the first signaling is transmitted on the time/frequency resource corresponding to the first signaling, or another signaling is transmitted on the time/frequency resource corresponding to the first signaling.

Optionally, the method further includes the following step.

If another data will be transmitted on the first time/frequency resource, then the data to be transmitted is transmitted on the first time/frequency resource or another data is transmitted on the first time/frequency resource.

Figure 3:
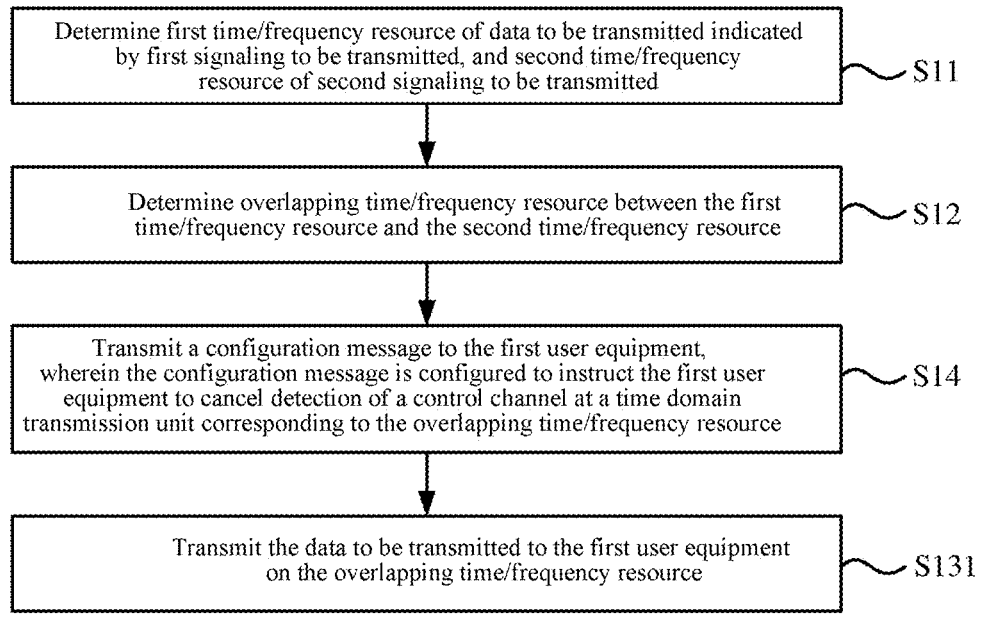
FIG. 3 shows a schematic flowchart of another transmitting method according to an embodiment of the present disclosure.

FIG. 3 shows a schematic flowchart of another transmitting method according to an embodiment of the present disclosure. As shown in FIG. 3, based on the embodiment shown in FIG. 1, the method further includes the following steps.

In step S14, a configuration message is transmitted to the first user equipment, wherein the configuration message is configured to instruct the first user equipment to cancel detection of a control channel at time domain transmission unit corresponding to the overlapping time/frequency resource.

Wherein, the step of transmitting the second signaling or transmitting the data to be transmitted to the first user equipment on the overlapping time/frequency resource includes the following step.

In step S131, the data to be transmitted is transmitted to the first user equipment on the overlapping time/frequency resource.

In one embodiment, the base station may transmit the configuration message to the first user equipment as independent signaling, or may carry the configuration message by the first signaling, thereby transmitting the configuration message to the first user equipment.

In one embodiment, if the base station transmits the data to be transmitted to the first user equipment on the overlapping time/frequency resource, that is, the base station does not transmit the second signaling to the first user equipment on the overlapping time/frequency resource, then the configuration message may be used to instruct the first user equipment to cancel detection of a control channel (for example, a physical downlink control channel used to transmit signaling) at the time domain transmission unit corresponding to the overlapping time/frequency resource, so that the first user equipment does not need to detect a control channel on the overlapping time/frequency resource, so as to save resource of the first user equipment.

Figure 4:
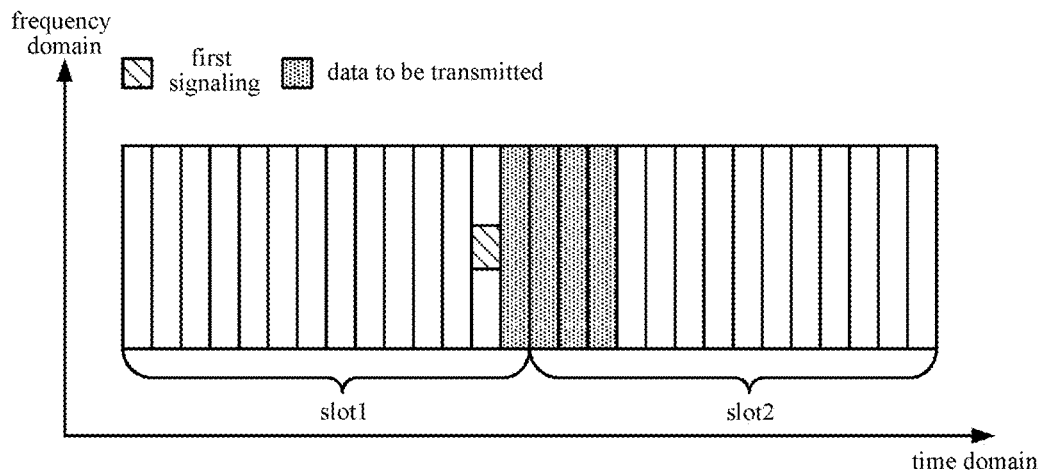
FIG. 4 shows a schematic diagram of another time/frequency resource according to an embodiment of the present disclosure.

FIG. 4 shows a schematic diagram of another time/frequency resource according to an embodiment of the present disclosure.

In one embodiment, as shown in FIG. 4, on the basis of the embodiment shown in FIG. 2, only the data to be transmitted may be transmitted on the first symbol of slot2, but not the second signaling.

Figure 5:
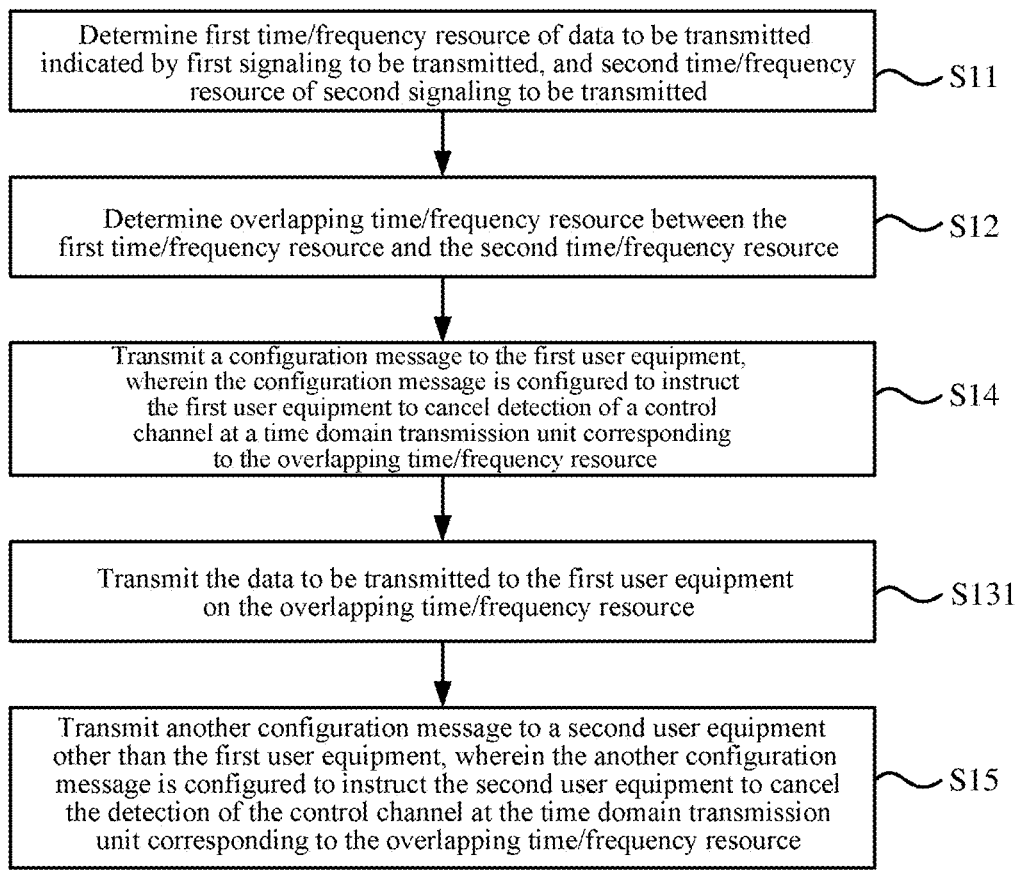
FIG. 5 shows a schematic flowchart of yet another transmitting method according to an embodiment of the present disclosure.

FIG. 5 shows a schematic flowchart of yet another transmitting method according to an embodiment of the present disclosure. As shown in FIG. 5, on the basis of the embodiment shown in FIG. 3, the method further includes the following step.

In step S15, another configuration message is transmitted to a second user equipment other than the first user equipment, wherein another configuration message is configured to indicate the second user equipment to cancel detection of the control channel at the time domain transmission unit corresponding to the overlapping the time/frequency resource.

In one embodiment, in addition to transmitting signaling to the first user equipment, the base station may also transmit signaling to the second user equipment, wherein the second user equipment may be user equipment in a connected state. In order to avoid missing the reception of the signaling sent by the base station, the second user equipment periodically detects the control channel, and in the case of the base station transmits only the data to be transmitted on the overlapping time/frequency resource, it does not transmit the signaling to the second user equipment. Therefore, the second user equipment may be instructed to cancel the detection of control channel at the time domain transmission unit corresponding to the overlapping time/frequency resource through another configuration message, so as to reduce the resource consumption of the second user equipment.

Figure 6:
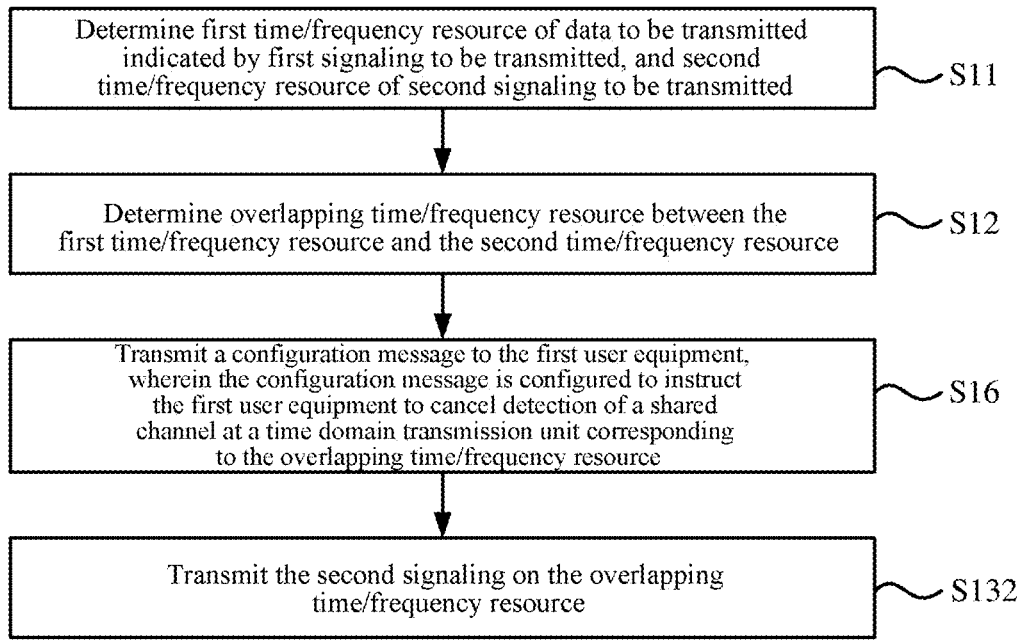
FIG. 6 shows a schematic flowchart of yet another transmitting method according to an embodiment of the present disclosure.

FIG. 6 shows a schematic flowchart of yet another transmitting method according to an embodiment of the present disclosure. As shown in FIG. 6, on the basis of the embodiment shown in FIG. 1, the method further includes the following steps.

In step S16, a configuration message is transmitted to the first user equipment, wherein the configuration message is configured to instruct the first user equipment to cancel detection of a shared channel at the time domain transmission unit corresponding to the overlapping time/frequency resource.

Wherein the step of transmitting the second signaling or transmitting the data to be transmitted to the first user equipment on the overlapping time/frequency resource includes the following step.

In step S132, the second signaling is transmitted on the overlapping time/frequency resource.

In one embodiment, the base station may transmit the configuration message to the first user equipment as independent signaling, or may carry the configuration message through the first signaling, thereby transmitting the configuration message to the first user equipment.

In one embodiment, if the base station transmits the second signaling on the overlapping time/frequency resource, that is, the base station does not transmit the data to be transmitted to the first user equipment on the overlapping time/frequency resource, then the first user equipment may be instructed to cancel detection of the shared channel (for example, a physical downlink shared channel used to transmit data) at the time domain transmission unit corresponding to the overlapping time/frequency resource through the configuration message, so that the first user equipment does not need to detect the shared channel on the overlapping time/frequency resource, so as to save resource of the first user equipment.

Figure 7:
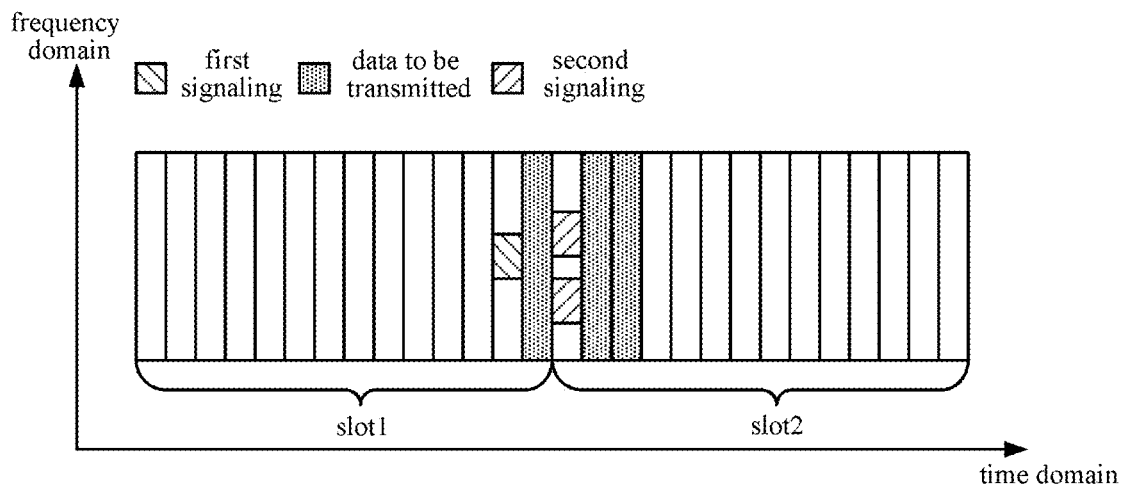
FIG. 7 shows a schematic diagram of yet another time/frequency resource according to an embodiment of the present disclosure.

FIG. 7 shows a schematic diagram of yet another time/frequency resource according to an embodiment of the present disclosure.

In one embodiment, as shown in FIG. 7, on the basis of the embodiment shown in FIG. 2, only the second signaling may be transmitted on the first symbol of slot2, but not the data to be transmitted.

Optionally, the configuration message may be included in the independent signaling or in the first signaling.

In one embodiment, the configuration message may be included in the independent signaling, or may be included in the first signaling, or may be pre-stored in the first user equipment, that is, the configuration message has been configured at the user equipment side in advance based on the communication protocol of the communication with the base station.

Figure 8:
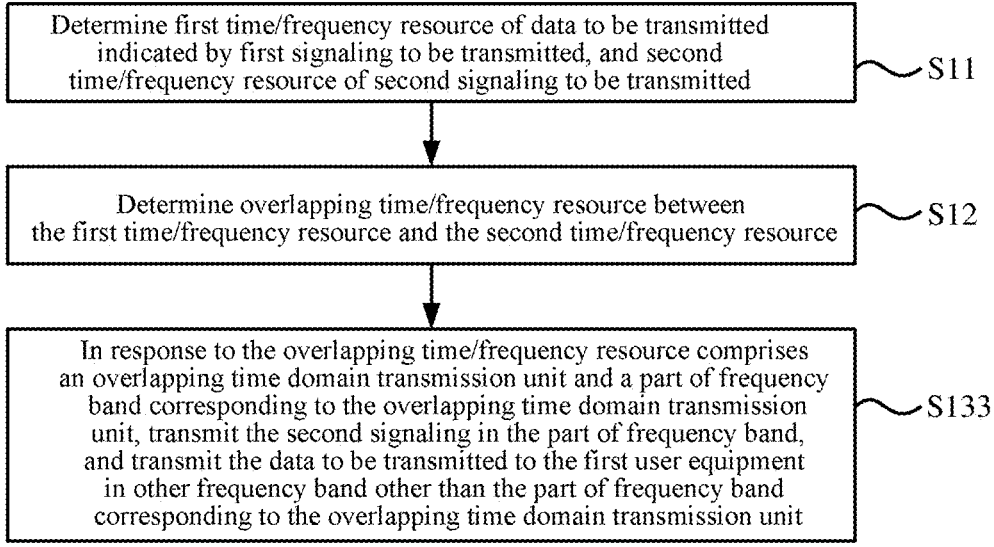
FIG. 8 shows a schematic flowchart of yet another transmitting method according to an embodiment of the present disclosure.

FIG. 8 shows a schematic flowchart of yet another transmitting method according to an embodiment of the present disclosure. As shown in FIG. 8, on the basis of the embodiment shown in FIG. 1, the step of transmitting the data to be transmitted to the first user equipment or transmitting the second signaling on the overlapping time/frequency resource includes the following step.

In step S133, if the overlapping time/frequency resource includes an overlapping time domain transmission unit and a part of frequency band corresponding to the overlapping time domain transmission unit, then transmitting the second signaling in the partial frequency band, and transmitting the data to be transmitted to the first user equipment in other frequency band other than the partial frequency band corresponding to the overlapping time domain transmission unit.

Figure 9:
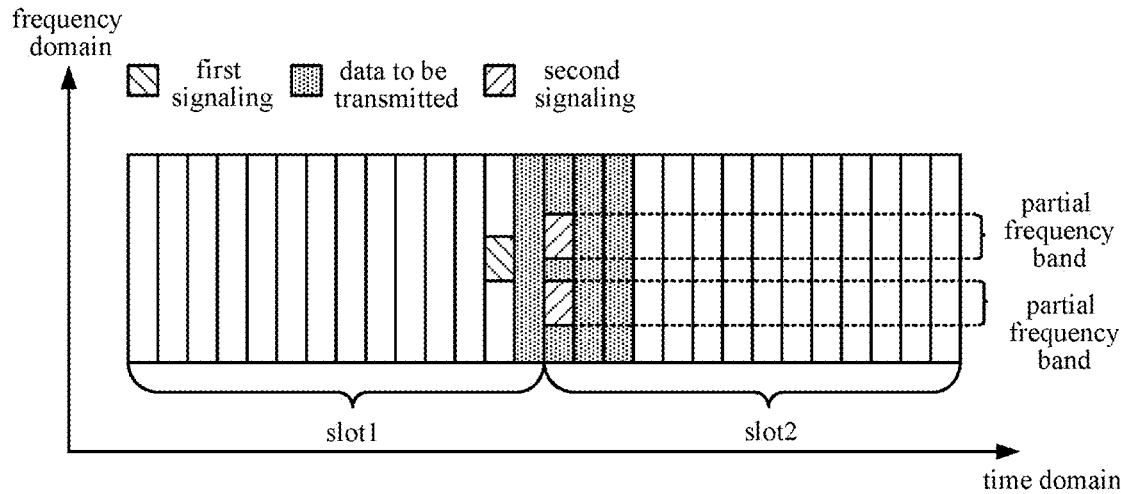
FIG. 9 shows a schematic diagram of yet another time/frequency resource according to an embodiment of the present disclosure.

FIG. 9 shows a schematic diagram of yet another time/frequency resource according to an embodiment of the present disclosure.

In one embodiment, as shown in FIG. 9, on the basis of the embodiment shown in FIG. 2, the second signaling may be transmitted in the part of frequency band in the first symbol of slot2, the data to be transmitted may be transmitted in other frequency band other than the part of frequency band corresponding to the overlapping time domain transmission unit.

In one embodiment, if the overlapping time/frequency resource includes the overlapping time domain transmission unit and the part of frequency band corresponding to the overlapping time domain transmission unit, that is, the first time/frequency resource and the second time/frequency resource completely overlap in the time domain, and only part of the frequency bands overlap in the frequency domain, then the second signaling can be transmitted in the overlapping partial frequency band, and the data to be transmitted may be transmitted to the first user equipment in other frequency band other than the partial frequency band corresponding to the overlapping time domain transmission unit, thereby making full use of frequency domain resource.

Figure 10:
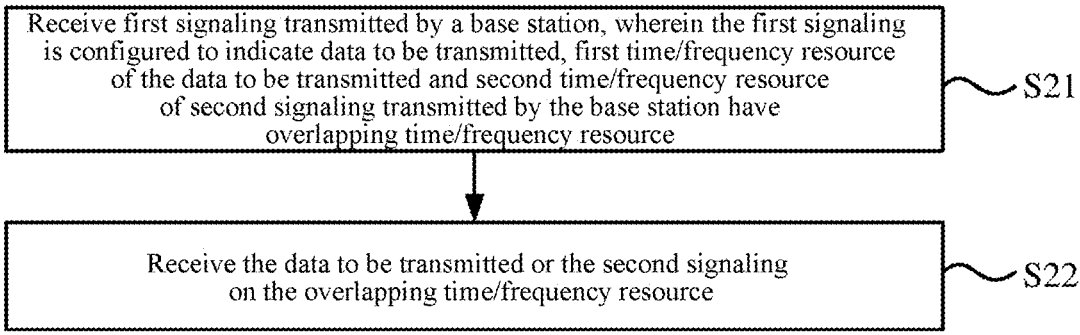
FIG. 10 shows a schematic flowchart of a receiving method according to an embodiment of the present disclosure.

FIG. 10 shows a schematic flowchart of a receiving method according to an embodiment of the present disclosure. The receiving method shown in this embodiment can be applied to user equipment, such as a mobile phone, a tablet computer, a wearable device, and other electronic devices. As shown in FIG. 10, the receiving method may include the following steps.

In step S21, first signaling transmitted by a base station is received, wherein the first signaling is configured to indicate data to be transmitted, and first time/frequency resource of the data to be transmitted and second time/frequency resource of the second signaling transmitted by the base station have overlapping time/frequency resource.

In step S22, the data to be transmitted or the second signaling is received on the overlapping time/frequency resource.

In one embodiment, in a case where there has overlapping time/frequency resource in the time/frequency resource overlapping between the first time/frequency resource and the second time/frequency resource, only the second signaling may be received on the overlapping time/frequency resource, or only the data to be transmitted may be received on the overlapping time/frequency resource, thereby avoiding conflicts between the reception of the second signaling and the reception of the data to be transmitted on the overlapping time/frequency resource, and ensuring that the reception operation can be smoothly carried out on the overlapping time/frequency resource.

Figure 11:
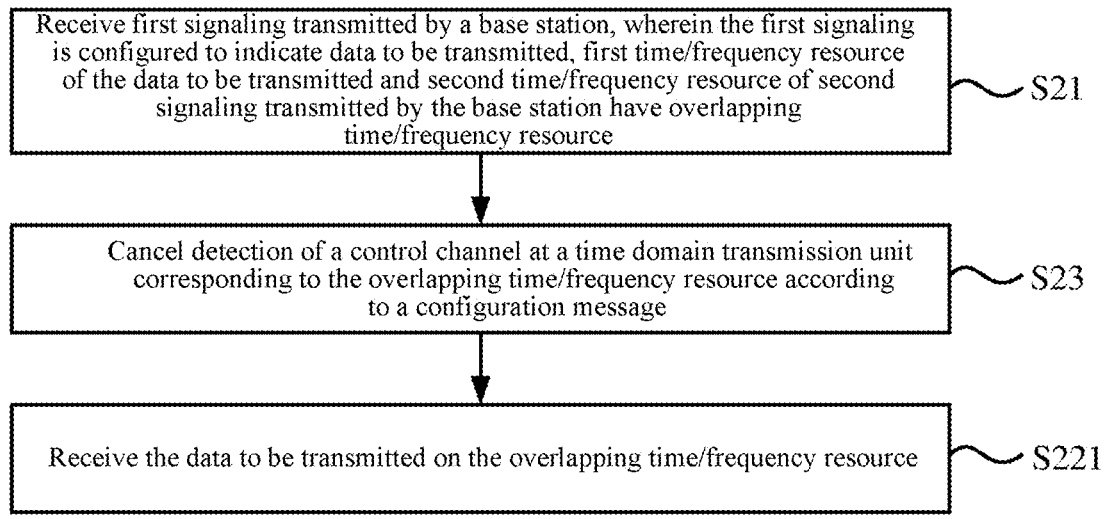
FIG. 11 shows a schematic flowchart of another receiving method according to an embodiment of the present disclosure.

FIG. 11 shows a schematic flowchart of another receiving method according to an embodiment of the present disclosure. As shown in FIG. 11, based on the embodiment shown in FIG. 10, the method further includes the following steps.

In step S23, detection of a control channel is canceled at a time domain transmission unit corresponding to the overlapping time/frequency resource according to a configuration message.

Wherein the step of receiving the data to be transmitted or the second signaling on the overlapping time/frequency resource includes step S221.

In step S221, the data to be transmitted is received on the overlapping time/frequency resource.

In one embodiment, if only the data to be transmitted is received on the overlapping time/frequency resource, that is, the second signaling is not received on the overlapping time/frequency resource, then the detection of the control channel (for example, a physical downlink control channel used to transmit signaling) can be canceled at the time domain transmission unit corresponding to the overlapping time/frequency resource according to the configuration message, in order to save resource.

Figure 12:
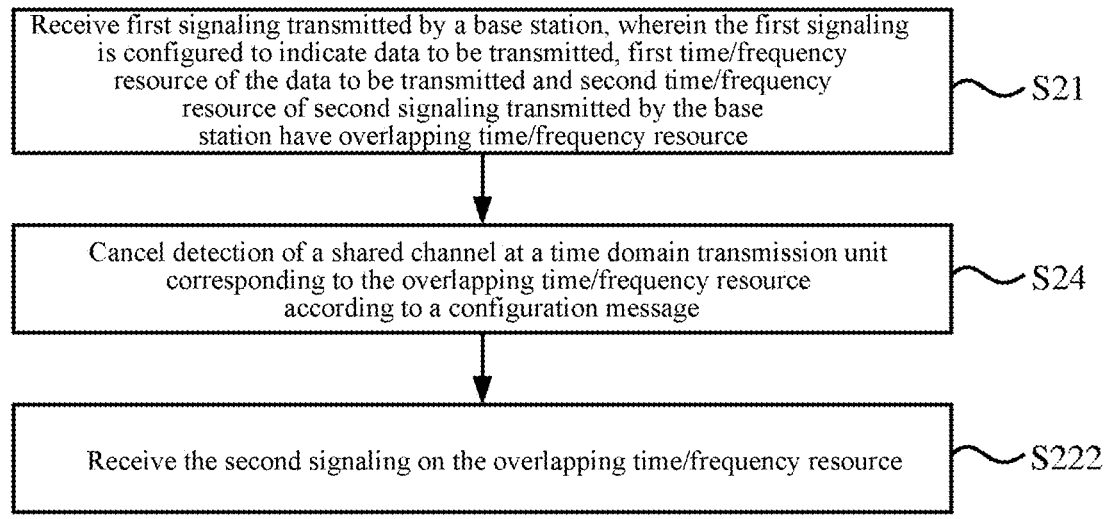
FIG. 12 shows a schematic flowchart of yet another receiving method according to an embodiment of the present disclosure.

FIG. 12 shows a schematic flowchart of yet another receiving method according to an embodiment of the present disclosure. As shown in FIG. 12, based on the embodiment shown in FIG. 10, the method further includes the following steps.

In step S24, the detection of the shared channel is canceled at the time domain transmission unit corresponding to the overlapping time/frequency resource according to a configuration message.

Wherein, the step of receiving the data to be transmitted or the second signaling on the overlapping time/frequency resource includes the step S222.

In step S222, the second signaling is received on the overlapping time/frequency resource.

In one embodiment, if only the second signaling is received on the overlapping time/frequency resource, that is, the data to be transmitted is not received on the overlapping time/frequency resource, then the detection of a shared channel (for example, physical downlink shared channel used to transmit signaling) can be canceled at the time domain transmission unit corresponding to the overlapping time/frequency resource according to the configuration message, in order to save resource.

Optionally, the configuration message is included in independent signaling transmitted by the base station, or included in the first signaling, or pre-stored in the user equipment.

Figure 13:
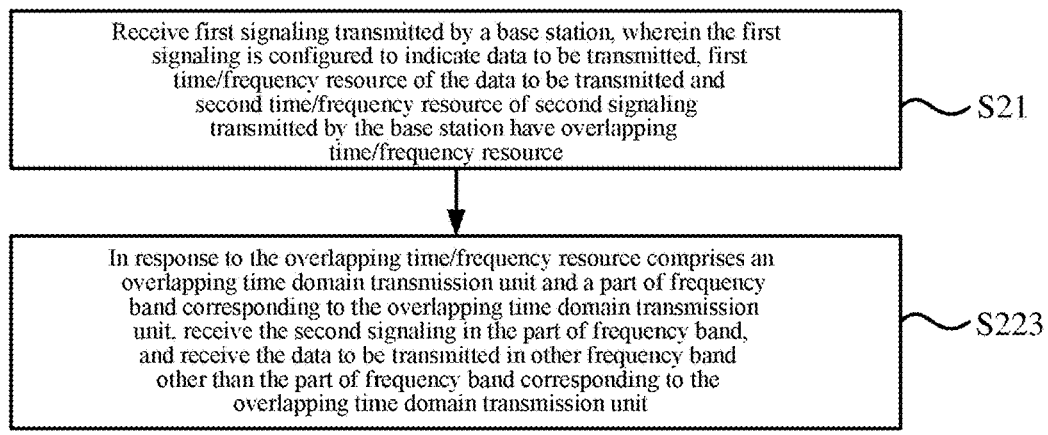
FIG. 13 shows a schematic flowchart of yet another receiving method according to an embodiment of the present disclosure.

FIG. 13 shows a schematic flowchart of yet another receiving method according to an embodiment of the present disclosure. As shown in FIG. 13, on the basis of the embodiment shown in FIG. 10, the step of receiving the data to be transmitted or the second signaling on the overlapping time/frequency resource includes the following steps.

In step S223, if the overlapping time/frequency resource includes an overlapping time-domain transmission unit and a part of frequency band corresponding to the overlapping time-domain transmission unit, then the second signaling is received in the part of frequency band, and the data to be transmitted is received in other frequency band other than the partial frequency band corresponding to the overlapping time domain transmission unit.

In one embodiment, if the overlapping time/frequency resource includes an overlapping time domain transmission unit and the part of frequency band corresponding to the overlapping time domain transmission unit, that is, the first time/frequency resource and the second time/frequency resource completely overlap in the time domain, and only part of the frequency bands overlap in the frequency domain, then the second signaling can be received in the overlapping partial frequency band, and the data to be transmitted may be received in other frequency band other than the partial frequency band corresponding to the overlapping time domain transmission unit, thereby making full use of frequency domain resource.

It should be noted that the time domain transmission unit may be one or more symbols, one or more slots, or one or more subframes.

Corresponding to the foregoing embodiments of the transmitting method and the receiving method, the present disclosure also provides embodiments of the transmitting device and the receiving device.

Figure 14:
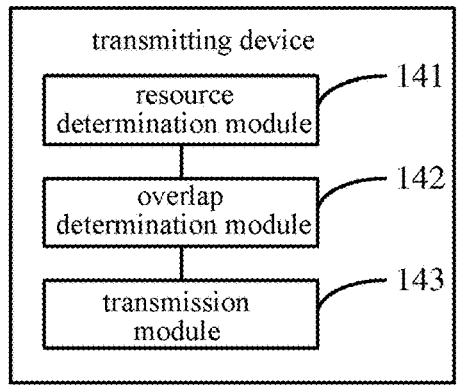
FIG. 14 shows a schematic block diagram of a transmitting device according to an embodiment of the present disclosure.

FIG. 14 shows a schematic block diagram of a transmitting device according to an embodiment of the present disclosure. The transmitting device shown in this embodiment can be applied to a base station, such as a 5G base station. As shown in FIG. 14, the transmitting device may include a resource determination module 141, an overlap determination module 142, and a transmission module 143.

The resource determination module 141 is configured to determine first time/frequency resource of data to be transmitted indicated by first signaling to be transmitted and second time/frequency resource of second signaling to be transmitted;

The overlap determination module 142 is configured to determine overlapping time/frequency resource between the first time/frequency resource and the second time/frequency resource;

The transmission module 143 is configured to transmit the second signaling or transmit the data to be transmitted to first user equipment on the overlapping time/frequency resource.

Optionally, the transmission module 143 is further configured to transmit a configuration message to the first user equipment, wherein the configuration message is configured to instruct the first user equipment to cancel detection of a control channel at time domain transmission unit corresponding to the overlapping time/frequency resource; and to transmit the data to be transmitted to the first user equipment on the overlapping time/frequency resource.

Optionally, the transmission module 143 is further configured to transmit another configuration message to second user equipment other than the first user equipment, wherein the another configuration message is configured to instruct the second user equipment to cancel detection of the control channel at the time domain transmission unit corresponding to the overlapping time/frequency resource.

Optionally, the transmission module 143 is further configured to transmit the configuration message to the first user equipment, wherein the configuration message is configured to instruct the first user equipment to cancel detection of a shared channel at time domain transmission unit corresponding to the overlapping time/frequency resource; and to transmit the second signaling on the overlapping time/frequency resource.

Optionally, the configuration message is included in independent signaling or in the first signaling.

Optionally, the transmission module is further configured to in the case of the overlapping time/frequency resource includes an overlapping time domain transmission unit and a part of frequency band corresponding to the overlapping time domain transmission unit, the second signaling is transmitted in the part of frequency band, and the data to be transmitted is transmitted to the first user equipment in one or more other frequency bands other than the part of frequency band corresponding to the overlapping time domain transmission unit.

Figure 15:
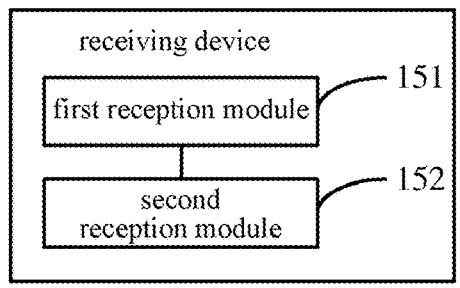
FIG. 15 shows a schematic block diagram of a receiving device according to an embodiment of the present disclosure.

FIG. 15 shows a schematic block diagram of a receiving device according to an embodiment of the present disclosure. The receiving device shown in this embodiment may be applicable to user equipment, such as a mobile phone, a tablet computer, a wearable device, and other electronic devices. As shown in FIG. 15, the receiving device may include a first reception module 151 and a second reception module 152.

The first reception module 151 is configured to receive first signaling transmitted by a base station, wherein the first signaling is configured to indicate data to be transmitted, first time/frequency resource of the data to be transmitted and second time/frequency resource of second signaling transmitted by the base station have overlapping time/frequency resource.

The second reception module 152 is configured to receive the data to be transmitted or the second signaling on the overlapping time/frequency resource.

Figure 16:
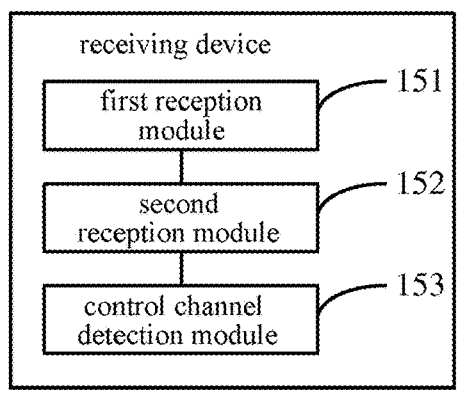
FIG. 16 shows a schematic block diagram of another receiving device according to an embodiment of the present disclosure.

FIG. 16 shows a schematic block diagram of another receiving device according to an embodiment of the present disclosure. As shown in FIG. 16, on the basis of the embodiment shown in FIG. 15, the receiving device further includes a control channel detection module 153.

The control channel detection module 153 is configured to cancel detection of the control channel at the time domain transmission unit corresponding to the overlapping time/frequency resource according to a configuration message.

Wherein, the second reception module 152 is configured to receive the data to be transmitted on the overlapping time/frequency resource.

Figure 17:
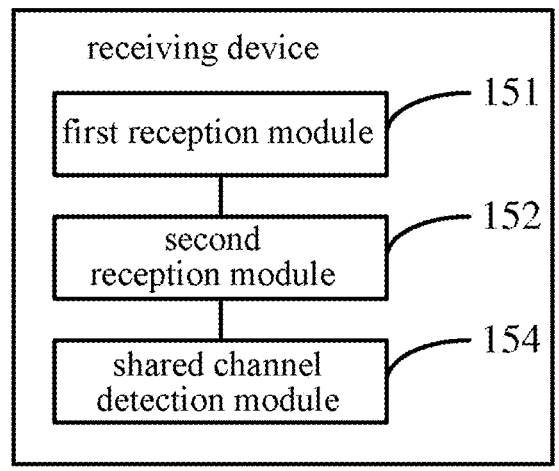
FIG. 17 shows a schematic block diagram of yet another receiving device according to an embodiment of the present disclosure.

FIG. 17 shows a schematic block diagram of yet another receiving device according to an embodiment of the present disclosure. As shown in FIG. 17, based on the embodiment shown in FIG. 15, the receiving device further includes a shared channel detection module 154.

The shared channel detection module 154 is configured to cancel detection of a shared channel at the time domain transmission unit corresponding to the overlapping time/frequency resource according to a configuration message.

wherein, the second reception module 152 is configured to receive the second signaling on the overlapping time/frequency resource.

Optionally, the configuration message is included in independent signaling transmitted by the base station, or included in the first signaling, or pre-stored in the user equipment.

Optionally, the second reception module 152 is configured to in the case of the overlapping time/frequency resource includes an overlapping time domain transmission unit and the part of frequency band corresponding to the overlapping time domain transmission unit, the second signaling is received in the part of frequency band, and the data to be transmitted is received in other frequency band other than the part of frequency band corresponding to the overlapping time domain transmission unit.

With regard to the device in the above embodiment, the specific manner in which each module performs operations has been described in detail in the embodiments of related methods, and will not be elaborated here.

For the device embodiment, since it basically corresponds to the method embodiment, the relevant part can be referred to the description of the method embodiment. The device embodiments described above are only schematic, wherein the units described as separate components may or may not be physically separated, and the components displayed as units may or may not be physical units, that is, they may be located in one place, or they may be distributed to multiple network elements. Some or all of the modules may be selected according to actual needs to achieve the purpose of the solution of this embodiment. Those of ordinary skill in the art can understand and implement without paying creative labor.

An embodiment of the present disclosure also proposes an electronic equipment, the electronic equipment includes:
  a processor; and
  a memory for storing instructions executable by the processor;
  wherein the processor is configured to:
  determine first time/frequency resource of data to be transmitted indicated by first signaling to be transmitted and second time/frequency resource of second signaling to be transmitted;
  determine overlapping time/frequency resource between the first time/frequency resource and the second time/frequency resource; and
  transmit the second signaling or transmitting the data to be transmitted to a first user equipment on the overlapping time/frequency resource.

An embodiment of the present disclosure also proposes an electronic equipment, the electronic equipment includes:
  a processor; and a memory for storing instructions executable by the processor;

wherein the processor is configured to:

receive first signaling transmitted by a base station, wherein the first signaling is configured to indicate data to be transmitted, first time/frequency resource of the data to be transmitted and second time/frequency resource of second signaling transmitted by the base station have overlapping time/frequency resource; and receive the data to be transmitted or the second signaling on the overlapping time/frequency resource.

An embodiment of the present disclosure also proposes a computer-readable storage medium having computer instructions stored thereon, when the instructions are executed by a processor, the following steps are implemented:

Determining first time/frequency resource of data to be transmitted indicated by first signaling to be transmitted and second time/frequency resource of second signaling to be transmitted;

determining overlapping time/frequency resource between the first time/frequency resource and the second time/frequency resource; and transmitting the second signaling or transmitting the data to be transmitted to a first user equipment on the overlapping time/frequency resource.

An embodiment of the present disclosure also proposes a computer-readable storage medium having computer instructions stored thereon, when the instructions are executed by a processor, the following steps are implemented:

receiving first signaling transmitted by a base station, wherein the first signaling is configured to indicate data to be transmitted, first time/frequency resource of the data to be transmitted and second time/frequency resource of second signaling transmitted by the base station have overlapping time/frequency resource; and receiving the data to be transmitted or the second signaling on the overlapping time/frequency resource.

Figure 18:
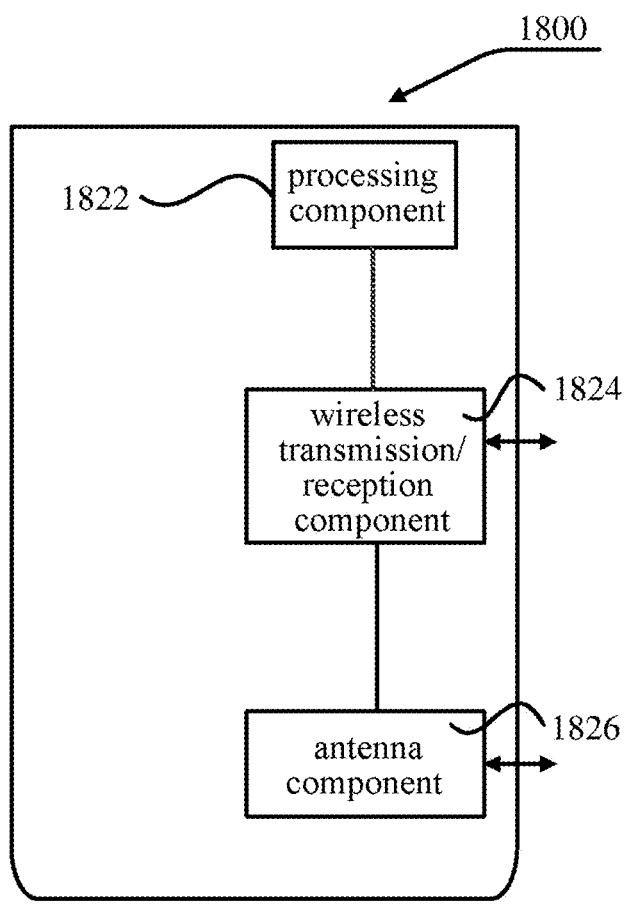
FIG. 18 is a schematic structural diagram showing an apparatus for transmission according to an exemplary embodiment.

As shown in FIG. 18, FIG. 18 is a schematic structural diagram showing an apparatus 1800 for transmission according to an exemplary embodiment. The apparatus 1800 may be provided as a base station. Referring to FIG. 18, the apparatus 1800 includes a processing component 1822, a wireless transmission/reception component 1824, an antenna component 1826, and a signal processing part unique to a wireless interface. The processing component 1822 may further include one or more processors. One of the processors in the processing component 1822 may be configured to perform the transmitting method described in any of the above embodiments.

Figure 19:
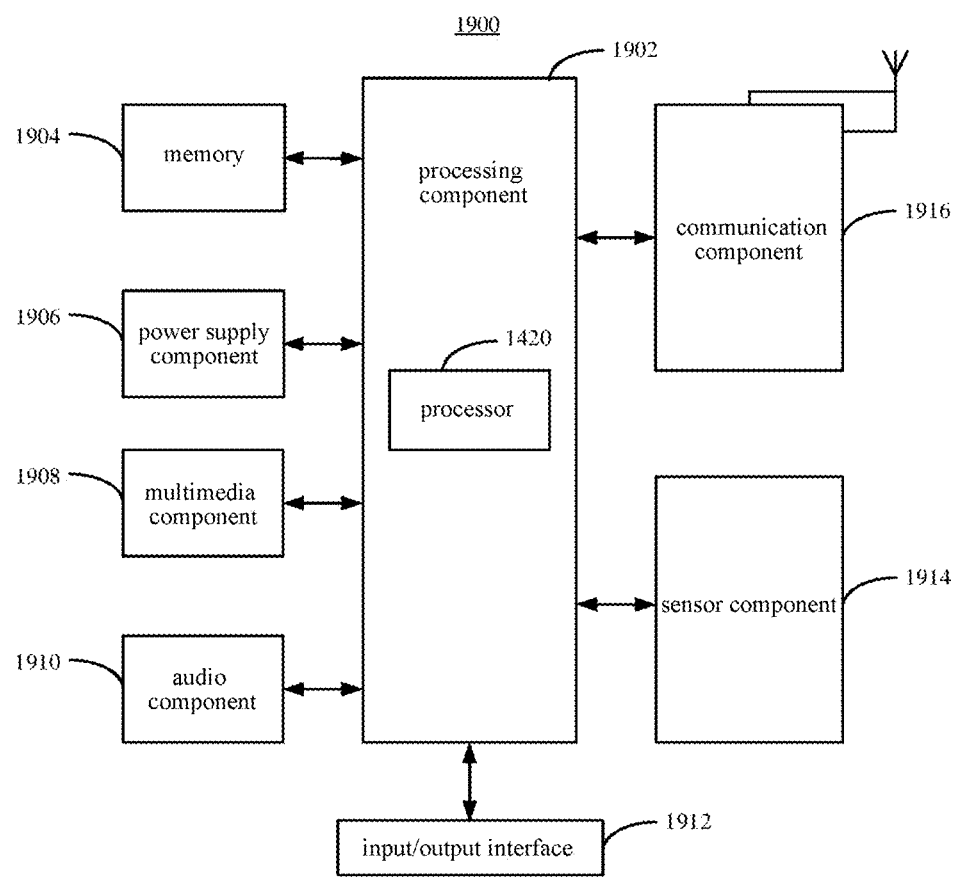
FIG. 19 is a schematic structural diagram showing an apparatus for reception according to an exemplary embodiment.

FIG. 19 is a schematic structural diagram showing an apparatus 1900 for reception according to an exemplary embodiment. For example, the apparatus 1900 may be a mobile phone, a computer, a digital broadcasting terminal, a messaging device, a game console, a tablet device, a medical device, a fitness device, a personal digital assistant, and so on.

Referring to FIG. 19, the apparatus 1900 may include one or more of the following components: a processing component 1902, a memory 1904, a power supply component 1906, a multimedia component 1908, an audio component 1910, an input/output (I/O) interface 1912, a sensor component 1914, and a communication component 1916.

The processing component 1902 generally controls the overall operations of the apparatus 1900, such as operations associated with display, telephone calls, data communication, camera operations, and recording operations. The processing component 1902 may include one or more processors 1920 to execute instructions to complete all or part of the steps in the above method. In addition, the processing component 1902 may include one or more modules to facilitate interaction between the processing component 1902 and other components. For example, the processing component 1902 may include a multimedia module to facilitate interaction between the multimedia component 1908 and the processing component 1902.

The memory 1904 is configured to store various types of data to support operations at the apparatus 1900. Examples of these data include instructions for any application or method operating on the apparatus 1900, contact data, phone book data, messages, pictures, videos, and so on. The memory 1904 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 1906 provides power to various components of the apparatus 1900. The power supply component 1906 may include a power supply management system, one or more power supplies, and other components associated with generating, managing, and distributing power for the apparatus 1900.

The multimedia component 1908 includes a screen between the apparatus 1900 and the user that provides an output interface. In some embodiments, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense the boundary of the touching action or swiping action, but also detect the duration and pressure related to the touching action or swiping operation. In some embodiments, the multimedia component 1908 includes a front camera and/or a rear camera. When the apparatus 1900 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 1910 is configured to output and/or input audio signals. For example, the audio component 1910 includes a microphone (MIC). When the apparatus 1900 is in an operation mode, such as a call mode, a recording mode, and a voice recognition mode, the microphone is configured to receive an external audio signal. The received audio signal may be further stored in the memory 1904 or sent via the communication component 1916. In some embodiments, the audio component 1910 further includes a speaker for outputting audio signals.

The I/O interface 1912 provides an interface between the processing component 1902 and a peripheral interface module. The peripheral interface module may be a keyboard, a click wheel, a button and so on. These buttons may include, but are not limited to: home button, volume button, start button, and lock button.

The sensor assembly 1914 includes one or more sensors for providing the status assessment of various aspects for the apparatus 1900. For example, the sensor component 1914 can detect the on/off state of the apparatus 1900, and the relative positioning of the components, for example, the component is a display and a keypad of the apparatus 1900, and the sensor component 1914 can also detect the position change of the apparatus 1900 or a component of the apparatus 1900, the presence or absence of user contact with the apparatus 1900, the orientation or acceleration/deceleration of the apparatus 1900, and the temperature change of the apparatus 1900. The sensor assembly 1914 may include a proximity sensor configured to detect the presence of nearby objects without any physical contact. The sensor assembly 1914 may also include a light sensor, such as a CMOS or CCD image sensor, for use in imaging applications. In some embodiments, the sensor assembly 1914 may also include an acceleration sensor, a gyro sensor, a magnetic sensor, a pressure sensor, or a temperature sensor.

The communication component 1916 is configured to facilitate wired or wireless communication between the apparatus 1900 and other devices. The apparatus 1900 can access a wireless network based on a communication standard, such as WiFi, 2G, or 3G, or a combination thereof. In an exemplary embodiment, the communication component 1916 receives a broadcast signal or broadcast related information from an external broadcast management system via a broadcast channel. In an exemplary embodiment, the communication component 1916 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1900 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the receiving method described in any of the above embodiments.

In an exemplary embodiment, there is also provided a non-transitory computer-readable storage medium including instructions, such as a memory 1904 including instructions, which can be executed by the processor 1920 of the apparatus 1900 to complete the above method. For example, the non-transitory computer-readable storage medium may be ROM, random access memory (RAM), CD-ROM, magnetic tape, floppy disk, optical data storage device, or the like.

In one or more embodiments, the transmitting method further includes: transmitting a configuration message to the first user equipment, wherein the configuration message is configured to instruct the first user equipment to cancel detection of a control channel at a time domain transmission unit corresponding to the overlapping time/frequency resource; wherein the transmitting the second signaling or transmitting the data to be transmitted to the first user equipment on the overlapping time/frequency resource includes: transmitting the data to be transmitted to the first user equipment on the overlapping time/frequency resource. In one or more embodiments, the transmitting method further includes: transmitting another configuration message to a second user equipment other than the first user equipment, wherein the another configuration message is configured to instruct the second user equipment to cancel the detection of the control channel at the time domain transmission unit corresponding to the overlapping time/frequency resource. In one or more embodiments, the transmitting method further includes: transmitting a configuration message to the first user equipment, wherein the configuration message is configured to instruct the first user equipment to cancel detection of a shared channel at a time domain transmission unit corresponding to the overlapping time/frequency resource; wherein the transmitting the second signaling or transmitting the data to be transmitted to the first user equipment on the overlapping time/frequency resource includes: transmitting the second signaling on the overlapping time/frequency resource. In one or more embodiments, the configuration message is included in independent signaling or included in the first signaling. In one or more embodiments, the transmitting the second signaling or transmitting the data to be transmitted to the first user equipment on the overlapping time/frequency resource includes: in response to the overlapping time/frequency resource includes an overlapping time domain transmission unit and a part of frequency band corresponding to the overlapping time domain transmission unit, transmitting the second signaling in the part of frequency band, and transmitting the data to be transmitted to the first user equipment in other frequency band other than the part of frequency band corresponding to the overlapping time domain transmission unit.

In one or more embodiments, the receiving method further includes: canceling detection of a control channel at a time domain transmission unit corresponding to the overlapping time/frequency resource according to a configuration message; wherein the receiving the data to be transmitted or the second signaling on the overlapping time/frequency resource includes: receiving the data to be transmitted on the overlapping time/frequency resource. In one or more embodiments, the receiving method further includes: canceling detection of a shared channel at a time domain transmission unit corresponding to the overlapping time/frequency resource according to a configuration message; wherein the receiving the data to be transmitted or the second signaling on the overlapping time/frequency resource includes: receiving the second signaling on the overlapping time/frequency resource. In one or more embodiments, the configuration message is included in independent signaling transmitted by the base station, or included in the first signaling, or pre-stored in the user equipment. In one or more embodiments, the receiving the data to be transmitted or the second signaling on the overlapping time/frequency resource includes: in response to the overlapping time/frequency resource includes an overlapping time domain transmission unit and a part of frequency band corresponding to the overlapping time domain transmission unit, receiving the second signaling in the part of frequency band, and receiving the data to be transmitted in other frequency band other than the part of frequency band corresponding to the overlapping time domain transmission unit.

In one or more embodiments, the transmission module is further configured to transmit a configuration message to the first user equipment, wherein the configuration message is configured to instruct the first user equipment to cancel detection of a control channel at a time domain transmission unit corresponding to the overlapping time/frequency resource; and to transmit the data to be transmitted to the first user equipment on the overlapping time/frequency resource. In one or more embodiments, the transmission module is further configured to transmit another configuration message to a second user equipment other than the first user equipment, wherein the another configuration message is configured to instruct the second user equipment to cancel detection of the control channel at the time domain transmission unit corresponding to the overlapping time/frequency resource. In one or more embodiments, the transmission module is further configured to transmit a configuration message to the first user equipment, wherein the configuration message is configured to instruct the first user equipment to cancel detection of a shared channel at the time domain transmission unit corresponding to the overlapping time/frequency resource; and to transmit the second signaling on the overlapping time/frequency resource. In one or more embodiments, the configuration message is included in independent signaling or in the first signaling. In one or more embodiments, the transmission module is further configured to in response to the overlapping time/frequency resource comprises an overlapping time domain transmission unit and a part of frequency band corresponding to the overlapping time domain transmission unit, transmit the second signaling in the part of frequency band, and transmit the data to be transmitted to the first user equipment in other frequency band other than the part of frequency band corresponding to the overlapping time domain transmission unit.

In one or more embodiments, the receiving device further includes: a control channel detection module configured to cancel detection of a control channel at the time domain transmission unit corresponding to the overlapping time/frequency resource according to a configuration message; wherein, the second reception module is configured to receive the data to be transmitted on the overlapping time/frequency resource. In one or more embodiments, the receiving device further includes: a shared channel detection module configured to cancel detection of a shared channel at the time domain transmission unit corresponding to the overlapping time/frequency resource according to a configuration message, wherein, the second reception module is configured to receive the second signaling on the overlapping time/frequency resource. In one or more embodiments, the configuration message is included in independent signaling transmitted by the base station, or included in the first signaling, or pre-stored in the user equipment. In one or more embodiments, the second reception module is configured to in the case of the overlapping time/frequency resource comprises an overlapping time domain transmission unit and a part of frequency band corresponding to the overlapping time domain transmission unit, receive the second signaling in the part of frequency band, and receive the data to be transmitted in other frequency band other than the part of frequency band corresponding to the overlapping time domain transmission unit.

According to the embodiments of the present disclosure, in a case where there has overlapping time/frequency resource in the time/frequency resource overlapping between the first time/frequency resource and the second time/frequency resource, only the second signaling may be transmitted on the overlapping time/frequency resource, or only the data to be transmitted may be transmitted to the first user equipment on the overlapping time/frequency resource, thereby avoiding conflicts between the transmission of the second signaling and the transmission of the data to be transmitted in the overlapping time/frequency resource, and ensuring that the base station can do the transmission operation smoothly in the overlapping time/frequency resource.

After considering the description and practice of the disclosure disclosed herein, those skilled in the art will easily think of other implementations of the disclosure. The present application is intended to cover any variations, usage, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are pointed out by the following claims.

It should be understood that the present disclosure is not limited to the precise structure that has been described above and shown in the drawings, and various modifications and changes can be made without departing from the scope thereof. The scope of the present disclosure is limited only by the appended claims.

It should be noted that in the present application, relational terms such as first and second are used only to distinguish one entity or operation from another entity or operation, and do not necessarily require or imply there has any such actual relationship or order between these entities or operations. The terms "include", "comprise", or any other variant thereof are intended to cover non-exclusive inclusion, so that a process, method, article, or equipment that includes a series of elements comprises not only those elements, but also others elements that are not explicitly listed, or also comprises elements inherent to such process, method, article, or equipment. Without more restrictions, the element defined by the sentence "include one . . . " does not exclude that there are other identical elements in the process, method, article or equipment that includes the element.

The methods and devices provided by the embodiments of the present invention have been described in detail above. Specific examples in the present application are used to explain the principles and implementations of the present invention. The descriptions of the above embodiments are only used to help understand the present invention and its core idea; meanwhile, for those of ordinary skill in the art, according to the idea of the present invention, there will be changes in the specific implementation and application scope. In summary, the content of this specification should not be understood as a limitation of invention.

What is claimed is:

1. A transmitting method, the method comprising:
    determining, by a base station, a first time/frequency resource for data to be transmitted, the data to be transmitted being indicated by a first signaling to be transmitted, and a second time/frequency resource for a second signaling to be transmitted on a control channel;
    determining, by the base station, an overlapping time/frequency resource conflicted between the first time/frequency resource and the second time/frequency resource;
    transmitting, by the base station, the second signaling on the overlapping time/frequency resource;
    in response to determining that the first time/frequency resource and the second time/frequency resource overlap in time domain and partially overlap in frequency domain, and the overlapping time/frequency resource comprises an overlapping time domain transmission unit and a part of frequency band corresponding to the overlapping time domain transmission unit, transmitting, by the base station, the second signaling in the part of frequency band; and
    in response to determining that the first time/frequency resource and the second time/frequency resource overlap in the time domain and partially overlap in the frequency domain, and the overlapping time/frequency resource comprises the overlapping time domain transmission unit and the part of frequency band corresponding to the overlapping time domain transmission unit, transmitting, by the base station, the data to be transmitted to user equipment in frequency band other than the part of frequency band corresponding to the overlapping time domain transmission unit.

2. An electronic equipment, comprising:
a processor; and
a memory for storing instructions executable by the processor;
wherein the processor is configured to execute the transmitting method according to claim 1.

3. A non-transitory computer-readable storage medium having computer instructions stored thereon, wherein the instructions are executed by a processor to execute the transmitting method according to claim 1.

4. A receiving method, the method comprising:
receiving, by a user equipment, a first signaling transmitted by a base station, wherein the first signaling is configured to indicate data to be transmitted, wherein a first time/frequency resource for the data to be transmitted and a second time/frequency resource for a second signaling transmitted by the base station are conflicted on an overlapping time/frequency resource; and
receiving, by the user equipment, the second signaling on the overlapping time/frequency resource;
in response to determining that the first time/frequency resource and the second time/frequency resource overlap in time domain and partially overlap in frequency domain, and the overlapping time/frequency resource comprises an overlapping time domain transmission unit and a part of frequency band corresponding to the overlapping time domain transmission unit, receiving, by the user equipment, the second signaling in the part of frequency band; and
in response to determining that the first time/frequency resource and the second time/frequency resource overlap in the time domain and partially overlap in the frequency domain, and the overlapping time/frequency resource comprises the overlapping time domain transmission unit and the part of frequency band corresponding to the overlapping time domain transmission unit, receiving, by the user equipment, the data to be transmitted in frequency band other than the part of frequency band corresponding to the overlapping time domain transmission unit.

5. A non-transitory computer-readable storage medium having computer instructions stored thereon, wherein the instructions are executed by a processor to execute the receiving method according to claim 4.

6. An electronic equipment, comprising:
at least one processor; and
a memory for storing instructions executable by the at least one processor; wherein the at least one processor is configured to:
receive a first signaling transmitted by a base station, wherein the first signaling is configured to indicate data to be transmitted, wherein a first time/frequency resource for the data to be transmitted and a second time/frequency resource for a second signaling transmitted on a control channel by the base station are conflicted on an overlapping time/frequency resource;
receive the second signaling on the overlapping time/frequency resource;
in response to determining that the first time/frequency resource and the second time/frequency resource overlap in time domain and partially overlap in frequency domain, and the overlapping time/frequency resource comprises an overlapping time domain transmission unit and a part of frequency band corresponding to the overlapping time domain transmission unit, the processor is further configured to receive the second signaling in the part of frequency band; and
in response to determining that the first time/frequency resource and the second time/frequency resource overlap in the time domain and partially overlap in the frequency domain, and the overlapping time/frequency resource comprises the overlapping time domain transmission unit and the part of frequency band corresponding to the overlapping time domain transmission unit, receive the data to be transmitted in frequency band other than the part of frequency band corresponding to the overlapping time domain transmission unit.

\* \* \* \* \*